(12) United States Patent
Bernabeu-Auban et al.

(10) Patent No.: US 9,038,071 B2
(45) Date of Patent: May 19, 2015

(54) OPERATING SYSTEM CONTEXT ISOLATION OF APPLICATION EXECUTION

(75) Inventors: Jose M. Bernabeu-Auban, Sammamish, WA (US); Stephen E. Dossick, Redmond, WA (US); Frank V. Peschel-Gallee, Redmond, WA (US); Yousef A. Khalidi, Bellevue, WA (US); Stephan J. Zachwieja, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1797 days.

(21) Appl. No.: 11/393,495

(22) Filed: Mar. 30, 2006

(65) Prior Publication Data
US 2007/0234359 A1   Oct. 4, 2007

(51) Int. Cl.
*G06F 21/53* (2013.01)
*G06F 9/46* (2006.01)

(52) U.S. Cl.
CPC ............... *G06F 21/53* (2013.01); *G06F 9/468* (2013.01)

(58) Field of Classification Search
None
See application file for complete search history.

(56) References Cited

U.S. PATENT DOCUMENTS

| | | | |
|---|---|---|---|
| 6,047,390 A | 4/2000 | Butt et al. | |
| 6,381,742 B2* | 4/2002 | Forbes et al. | 717/176 |
| 7,318,203 B2* | 1/2008 | Purves et al. | 715/853 |
| 8,006,240 B2* | 8/2011 | Bhatkhande et al. | 717/169 |
| 8,104,038 B1* | 1/2012 | Graupner | 718/104 |
| 2003/0110205 A1* | 6/2003 | Johnson | 709/104 |
| 2004/0194064 A1* | 9/2004 | Ranjan et al. | 717/124 |
| 2004/0226019 A1* | 11/2004 | Tucker et al. | 719/310 |
| 2004/0268361 A1 | 12/2004 | Schaefer | |
| 2005/0066340 A1 | 3/2005 | Mathur et al. | |
| 2005/0091214 A1* | 4/2005 | Probert et al. | 707/9 |
| 2005/0108678 A1* | 5/2005 | Goodwin et al. | 717/100 |

* cited by examiner

*Primary Examiner* — Eric C Wai
(74) *Attorney, Agent, or Firm* — John Jardine; Kate Drakos; Micky Minhas

(57) ABSTRACT

The resources needed by an application to execute are declared by the application. When the application is activated, only the declared resources are made available to the application because only the declared resources are connected to the execution environment. Accessibility to resources may be controlled by the operating system by making the resource visible or invisible to the executing software by mapping a local name used by the executing software to a global resource, possibly limiting the type of access allowed. Because the executing software relies on the mapping function performed by the operating system for access to resources, and the operating system only maps names declared by the software, the operating system can isolate the software, and prevent the application from accessing undeclared global resources.

14 Claims, 3 Drawing Sheets

OPERATING SYSTEM CONTEXT ISOLATION OF APPLICATION EXECUTION

BACKGROUND

A typical operating system does not know what executable software resides on the machine nor does it know what resources are needed by the software to execute. An application that is written to be run by such an operating system typically assumes that it will have access to a global namespace. The global namespace is used to resolve names and to obtain values and resources. A number of drawbacks are associated with use of a global namespace. Firstly, use of a global namespace makes it difficult to isolate applications so that one application does not maliciously or unintentionally affect another application during concurrent execution. For example, a first application may store its state in a file of a particular name in the global namespace. A second application may store its state in the same file. If the applications execute at the same time, each application's state may be overwritten by the other's. Secondly, machine resources accessed via a global namespace are shared by all the applications running on the machine. Because the application is able to find any resource in the global namespace, the application is potentially able to access and use it. Access to the resources is typically controlled by ACLs (access control lists). Access is allowed or refused based on an administrative function that associates access privileges with the identity of the user. The operating system does not control access to resources based on the application making the request and is unable to determine what resources a program needs. It follows that an application may well have access to resources that it does not need, enabling a malicious program to compromise the integrity of the system. The operating system is unable to prevent this from happening.

SUMMARY

The operating system controls access to resources by creating a construct called a context. The context can be used to isolate application software so that it is unable to unintentionally affect other concurrently executing applications or their resources. The context may be used to control what resources are available to an executing software entity. The resources needed by the software to execute are declared by the software. The resources declared by the software are cataloged and when the software is activated, only the declared resources can be made available to the software by connecting them to the execution environment. A manifest declaring the resources needed by the software may be associated with the software code and packaged together as a unit called a software item. Only the resources declared in the manifest may be made available to the software code when it executes. The resources declared in the manifest may be cataloged when the software is installed. When the software is executed, only the cataloged resources may be connected to the execution environment. Accessibility to resources may be controlled by the operating system by making the resource visible or invisible to the executing software by mapping a local name used by the executing software to a global resource. Because the executing software relies on the mapping function performed by the operating system for access to resources, and the operating system only maps names declared by the software, the operating system can isolate the software, and prevent it from accessing undeclared global resources.

The context may include an installation service, a configuration service and an activation service. The installation service is responsible for installing, uninstalling and servicing software entities within its context. The installation service keeps track of what software is installed and available within the context, and what resources are needed by the software to run. The installation service makes installed software available to the activation service. The activation service resolves configuration settings and resource values, constructs the environment in which an application runs and initiates the running of the software. The configuration service maintains and manages configuration settings associated with the software and provides configuration settings to the activation service during activation of software.

DETAILED DESCRIPTION

Overview

An operating system is aware of what executable software resides on the machine and what resources are needed by an application to execute. The operating system is aware of how or if one piece of software depends on another. Therefore, the operating system is able to determine if a particular piece of software is incapable of execution. That is, if one or more pieces of software on which an application depends is missing, the application will not be able to execute.

Even if an application is written assuming that it will have access to a global namespace, resources may be limited by the operating system to those required for execution. A structure for controlling access to resources is created by the operating system. In some embodiments of the invention, the structure for controlling access to resources is the context. A context may include an installation service, a configuration service and an activation service. A context may represent a system context, developer context, manager context, user context or other type of context. When an application is started, the context determines the required resources and makes only those resources accessible to the application. Resources include but are not limited to system namespaces such as file systems and network devices.

The operating system isolates an application by using the context to control what resources are available to an executing application. Only those resources declared by the software are connected to the execution environment for the application. In some embodiments of the invention, the resources needed by a software entity to execute are declared in a manifest as configuration settings associated with the software code whose values may point to the resources the active software will be able to access, and only the resources declared in the manifest via those configuration settings are made available to the software code when it executes. The resources declared in the manifest may be cataloged when the software is installed. When the software is executed, only the cataloged resources are connected to the execution environment. When software requires other software to operate (the required programs are called dependencies), a resolution set may include all the pieces of software required by the software to be activated, and their dependencies. In some embodiments of the invention, accessibility to resources is controlled by making the resource visible or invisible to the executing software by using a local name in the execution environment to refer to a global resource. The manifest may accompany the code and may be packaged along with the code into a single unit called a software item.

Exemplary Computing Environment

Figure 1:
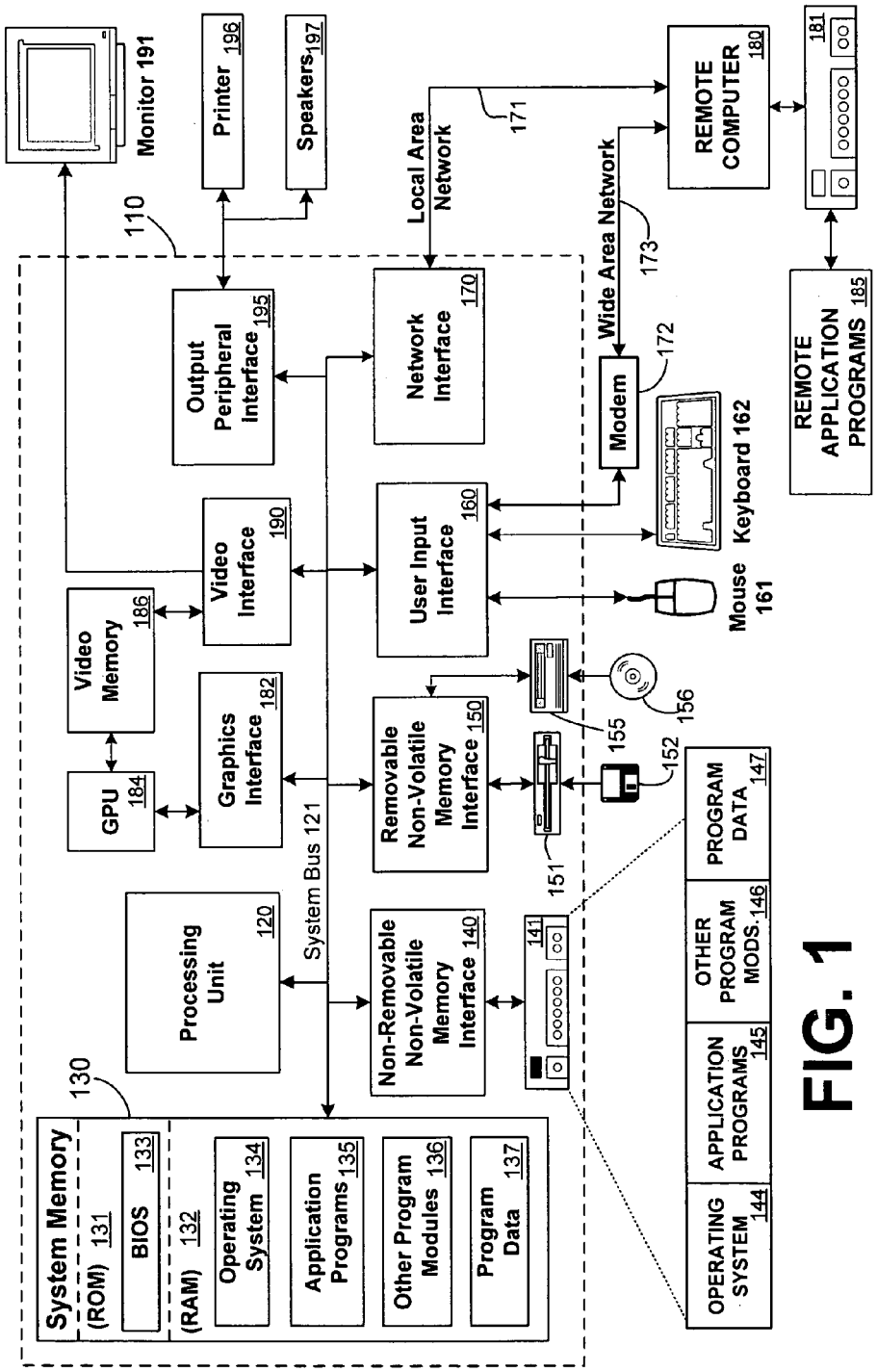
FIG. 1 is a block diagram illustrating an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Isolating Application Execution

Figure 2:
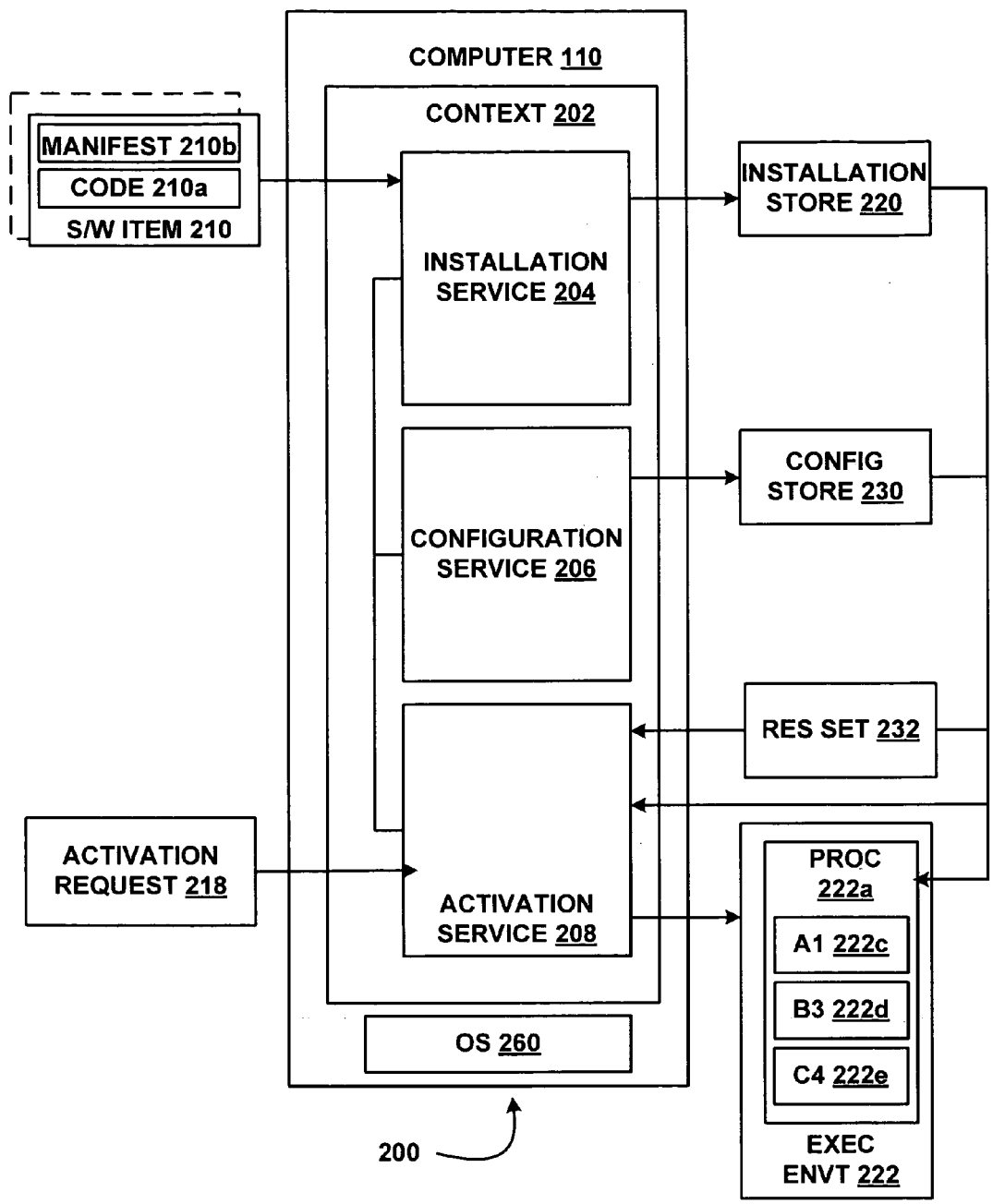
FIG. 2 is a block diagram of a system for isolating application execution in accordance with some embodiments of the invention.

A context may include an installation service, a configuration service and an activation service. FIG. 2 illustrates one embodiment of a system 200 for isolating application execution as described above. System 200 may reside on a computer such as computer 110 described above with respect to FIG. 1. In FIG. 2, a context 202 created by an operating system 260 includes one or more of the following components: an installation service 204, a configuration service 206 and an activation service 208. In some embodiments of the invention, a context manages software units (software entities) called software items. A software item such as software item 210 may include software code 210*a* and metadata including dependencies (other software required by the software code 210*a* to execute) and other resources (such as but not limited to values or pointers to system namespaces such as file systems, network devices, shared memory components, and service endpoints) needed by the software code 210*a* to execute. In some embodiments of the invention, the metadata is provided in the form of a manifest 210*b*.

An installation service (e.g., installation service 204) keeps track of what software is installed and available within the context and what resources are needed by the software to run. The installation service 204 also installs, removes, and services software and makes the installed software available to the activation service 208. Servicing software makes a newer version of the software available to the system, and may include the installation of the newer version of the software and organizing and storing the metadata associated with the new software. The installation service may store installed software in an installation store 220.

Software available within the context 202 may include software installed within a parent context installation store (not shown). That is, contexts may be linked or arranged hierarchically to form a directed acyclic graph. The ability to access software can be inherited through creation of a parent/child hierarchy. In general if a context such as Context U is linked to another context, Context S, where Context S is the parent of Context U, the software items installed in Context S are visible to Context U so that the set of software items available in Context U is the union of those available in Context U and those available in Context S.

When an application is initiated, the installation service 204 provides the activation service 208 with the software needed for the application to run.

The configuration service 206 maintains, manages and mediates configuration settings associated with the software. Before an application is activated, its properties must be initialized to proper values. The process of setting these values is called configuration. In some embodiments of the invention, property values for an application are stored in a configuration store 230. When an application is activated, the configuration service 206 provides configuration settings for the application from the configuration store 230 to the activation service 208.

The activation service 208 constructs the execution environment 222 in which an application will run and initiates the software. The activation service 208 resolves configuration settings received from the configuration service 206 and provides the process 222a (an executing instance of the application) with the values needed for the application to run. The activation service 208 resolves dependencies, determines if all dependencies are satisfied and if all required dependencies are available, loads the software satisfying the dependencies (received from the installation service 204) into the execution environment 222. An application cannot be activated unless all of the required dependencies are satisfied. The activation service 208 connects the resources declared by the application (e.g., in its manifest) to the execution environment 222, thus building the isolation environment for the application. The activation service 208 may receive a request 218 to activate an application or software item 210. The application or software item 210 must be stored in the installation store 220 or the installation store of a parent context. If the application or software item 210 is found, the installation service 208 determines a set of dependencies that satisfy the application's dependencies (a resolution set 232), obtains configuration settings for the application from the configuration service, creates an execution environment, configures it, populates it with the required software and starts the application.

Figure 3:
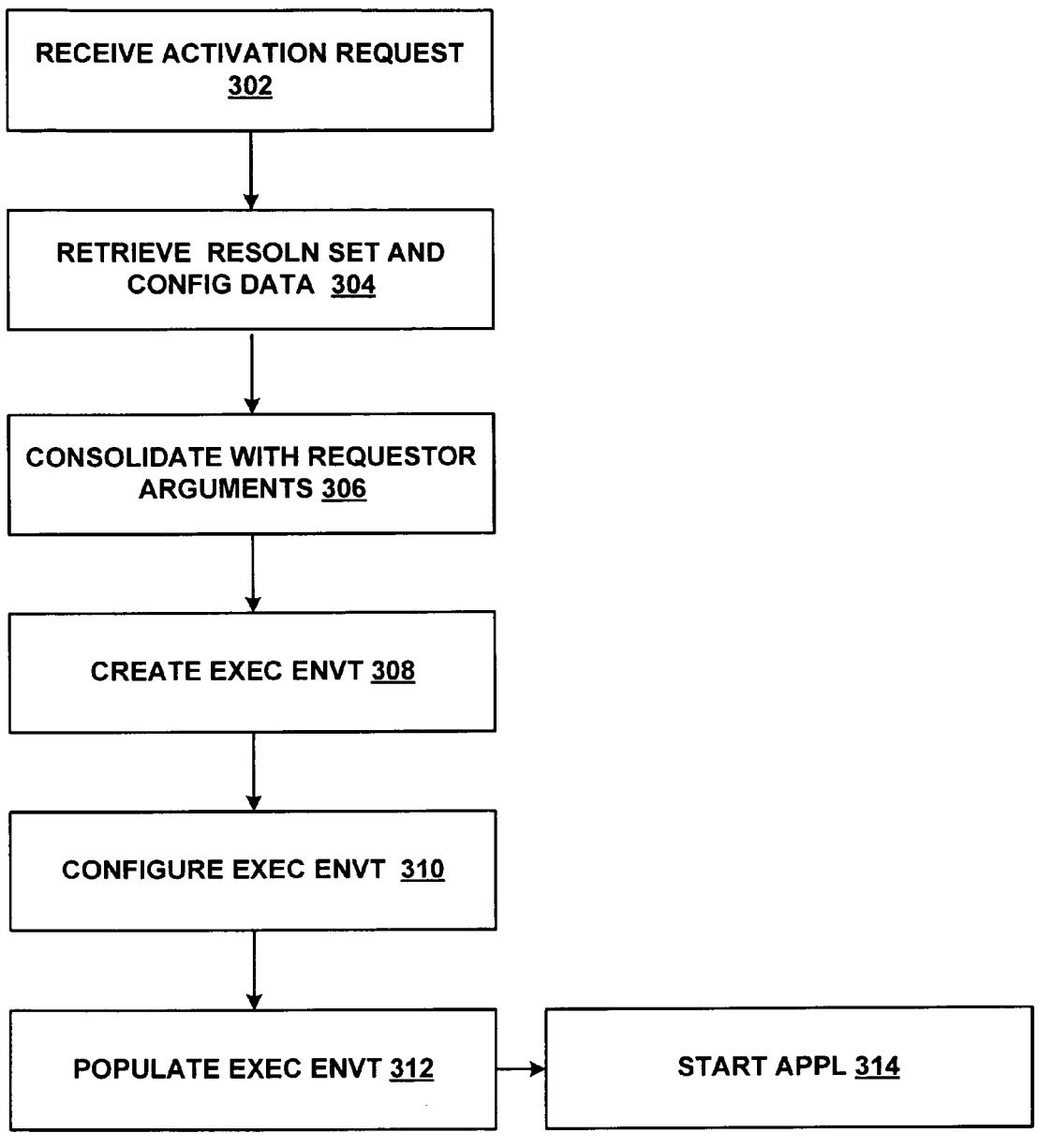
FIG. 3 is a flow diagram of a method for isolating application execution in accordance with some embodiments of the invention.

FIG. 3 illustrates a method 300 for isolating application execution in accordance with some embodiments of the invention by creation of a context, as described above. At 302 a request to activate an application or piece of software such as a software item is received. The request to activate may be accompanied by or may include information providing connections between names or arguments that alter or override some configuration data stored for the software item. Suppose, for example, a request to activate software item A version 1 is received. Suppose further that when software item A version 1 was received, it was accompanied by a manifest that listed its dependencies as B version 3. B version 3 may itself have a dependency on software item C version 4. Suppose C version 4 has no dependencies. Suppose software items A version 1, B version 3 and C version 4 are stored in installation store 220. The manifest may have also included configuration information such as a list of properties and the values that should be assigned to those properties. Suppose this configuration data for software item A version 1 is stored in configuration store 230. Suppose further that the activation request includes argument data that overrides some of the configuration data—say in a print spool, the argument data changes a tab from advancing 4 spaces to advancing 8 spaces.

In order for a software item to be successfully activated, the software item must be installed in a context. If the software item is not found an error message is generated. In some embodiments, a software item will be found if the software item is installed or stored in an installation store accessible to the context. In some embodiments of the invention, that means that the software item must be found in an installation store such as installation store 220 of FIG. 2 or in the installation store of a parent context. At 304 the resolution data and configuration data for the software item is retrieved. As described above, resolution data refers to a solution set of software items that satisfy the dependencies of the software item to be executed. Configuration data refers to settings and values for properties required by the software item to execute. For the example, the resolution data (the set of software items that satisfies A version 1's dependencies, in this case, software items A version 1, B version 3 and C version 4) is determined. At 306, the configuration data is consolidated with requester arguments, if any (received with the activation request). For example, the configuration data stored in the configuration store for A version 1 may be consolidated with a requestor argument that specifies that a tab in a print job is changed from 4 spaces to 8 spaces. At 308, the execution environment is created. In some embodiments of the invention, creation of the execution environment includes creating an operating system container in which the software item can execute. In some embodiments the container created by the operating system for execution of the application is a silo. (A silo may be created for software item A version 1.) At 310 the environment is configured, using the configuration data from the configuration store as modified by consolidation of the configuration data and the argument data. (Configuration settings for A version 1 are set in the execution environment, as modified by the requestor arguments changing the tab from 8 to 4 spaces). At 312 the execution environment is populated. Populating the execution environment includes connecting resources to the execution environment by mapping a local name for the resource to a global name. The local name is the name declared by the software item. Because the global name is not known by the application, and the operating system maps the local name to the global name, the application cannot acquire access to undeclared global resources because the operating system only maps global names to declared resources. That is, when the execution environment is populated, the only connections established are ones specified as required by the software (i.e., either declared in the manifest or listed in the resolution set). Thus, referring again to FIG. 2, the only software loaded into the execution environment are those declared by the software item and the only resources accessible to the software item are those declared. In the example, only software items A version 1 222c, B version 3 222d and C version 4 222e are loaded into execution environment 222 and only connections to resources declared in A version 1's manifest are made, effectively creating an isolated execution environment for A version 1. At 314, the process is started (the application is initiated). It will be appreciated that one or more of the above listed actions may be optional or skipped and that the actions may proceed in a sequence other than that depicted in FIG. 3.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system comprising:
    a hardware processor; and
    an operating system that is run by the hardware processor, wherein the operating system:
        receives a software item comprising a manifest and a first software code, the manifest disclosing a set of resources needed by the first software code for executing an application, and further disclosing a resolution set comprising dependencies indicative of at least a second software code installed within a parent context installation store needed by the first software code for executing the application;
        catalogs the set of resources when the first software code is installed in the system;
        creates at least one context for controlling resource availability to the application, the at least one context comprising an activation service for creating an isolated execution environment for the application and for initiating execution of the first software code in the isolated execution environment in response to receiving an activation request, the activation request comprising a requestor argument;
        configures, using the requestor argument, the manifest, and the resolution set, the isolated execution environment; and
        exclusively loads the at least a second software code into the isolated execution environment and connects only the cataloged set of resources to the isolated execution environment while denying access to other software code and other resources that are not included in the manifest and the resolution set.

2. The system of claim 1, further comprising:
    an installation service for storing the software item comprising the first software code and the manifest.

3. The system of claim 1, wherein the isolated execution environment is further configured using a configuration setting provided by a configuration service.

4. The system of claim 1, wherein the operating system limits the resources available to the application by making unavailable resources invisible to the application.

5. The system of claim 1, wherein the first software code is identified by a first version number and the at least a second software code that is needed by the first software code for executing the application is identified by a second version number.

6. The system of claim 5, wherein the first version number is different than the second version number.

7. The system of claim 6, wherein the at least a second software code has a dependency on a third software code having a third version number.

8. The system of claim 7, wherein loading the at least a second software code into the isolated execution environment comprises loading into the isolated execution environment, the first, second, and third software codes based on the respective version numbers.

9. The system of claim 1, wherein the at least a second software code is installed within a parent context installation store.

10. A method comprising:
    receiving a software item comprising a manifest and a first software code, the manifest disclosing a set of resources needed by the first software code for executing an application, and further disclosing a resolution set comprising dependencies indicative of at least a second software code installed within a parent context installation store needed by the first software code for executing the application;
    cataloging the set of resources when the first software code is installed in a computer system;
    receiving an activation request for the application comprising a request or argument;
    determining from the cataloging, the set of resources and the resolution set required by the application to execute;
    creating at least one context for controlling resource availability to the application, the at least one context comprising an activation service for creating an isolated execution environment for the application;
    configuring, using the requestor argument, the manifest and the resolution set, the isolated execution environment; and
    exclusively loading the at least a second software code into the isolated execution environment and connecting only the cataloged set of resources to the isolated execution environment while denying access to other resources and software items that are not included in the manifest and the resolution set.

11. The method of claim 10, wherein a local name for a required resource of the set of resources is mapped to a global name that is restricted from being made known to the application.

12. The method of claim 10, further comprising starting the application.

13. A computer-readable storage medium having a concrete, tangible, physical, structure, the medium having program code stored thereon that, when executed by a computing environment, causes the computing environment to:
    receive a software item comprising a manifest and a first software code, the manifest disclosing a set of resources needed by the first software code for executing an application, and further disclosing a resolution set comprising dependencies indicative of at least a second software code within a parent context installation store needed by the first software code for executing the application;
    catalog the set of resources when the first software code is installed;
    receive an activation request for the application comprising a request or argument;
    create at least one context for controlling resource availability to the application, the at least one context comprising an activation service for creating an isolated execution environment for the application;

configure, using the requestor argument, the manifest and the resolution set, the isolated execution environment; and determine from the cataloging, the set of resources and the resolution set required by the application to execute;

exclusively load the at least a second software code into the isolated execution environment and connecting only the cataloged set of resources to the isolated execution environment while denying access to other resources and software items that are not included in the manifest and the resolution set.

14. The computer-readable storage medium of claim 13, having further program code stored thereon, that when executed by the computing environment, causes the computing environment to:

map a local name for a resource of the set of resources required by the application to execute to a global name for the resource, the global name for the resource restricted from being made known to the application.

* * * * *